US007416074B2

(12) United States Patent
Otomo et al.

(10) Patent No.: US 7,416,074 B2

(45) Date of Patent: Aug. 26, 2008

(54) BELT CONVEYING DEVICE, IMAGE FORMING APPARATUS PROVIDED THEREWITH AND ADJUSTMENT METHOD OF BELT SKEW CONTROLLER IN BELT CONVEYANCE DEVICE

(75) Inventors: Naoki Otomo, Otsuki (JP); Shuri Mizoguchi, Kunitachi (JP); Yasushi Niizeki, Hachioji (JP); Minoru Maekawara, Hino (JP); Kyosei Miyata, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/890,846

(22) Filed: Aug. 8, 2007

(65) Prior Publication Data

US 2008/0044211 A1 Feb. 21, 2008

(30) Foreign Application Priority Data

Aug. 18, 2006 (JP) ............................ 2006-223436
Jun. 21, 2007 (JP) ............................ 2007-164415

(51) Int. Cl.
*B65G 43/00* (2006.01)
*G03G 15/00* (2006.01)

(52) U.S. Cl. ................. 198/810.03; 198/806; 399/163; 399/165

(58) Field of Classification Search ................. 198/806, 198/810.03, 957; 399/163, 165, 395
See application file for complete search history.

(56) References Cited

U.S. PATENT DOCUMENTS

| | | | | |
|---|---|---|---|---|
| 2,451,394 | A * | 10/1948 | Klein | 198/806 |
| 4,557,372 | A * | 12/1985 | Rajagopal | 198/807 |
| 4,779,782 | A * | 10/1988 | Ricoux et al. | 226/21 |
| 4,959,040 | A * | 9/1990 | Gardner et al. | 474/103 |
| 5,479,241 | A | 12/1995 | Hou et al. | |
| 5,515,139 | A * | 5/1996 | Hou et al. | 399/38 |
| 6,078,766 | A * | 6/2000 | Kurotaka | 399/165 |
| 6,104,899 | A * | 8/2000 | Hokari et al. | 399/165 |
| 6,631,253 | B2 * | 10/2003 | Nakafuji et al. | 399/329 |
| 6,712,200 | B2 * | 3/2004 | Ubaldi | 198/810.03 |
| 6,805,235 | B2 * | 10/2004 | Tulkki | 198/807 |
| 6,830,212 | B1 * | 12/2004 | Harris | 242/615.1 |
| 6,865,358 | B2 * | 3/2005 | Lee | 399/167 |
| 6,925,279 | B2 * | 8/2005 | Kamoshita et al. | 399/303 |
| 6,931,227 | B2 * | 8/2005 | Koide | 399/165 |
| 7,016,635 | B2 * | 3/2006 | Koide | 399/299 |
| 7,149,446 | B2 * | 12/2006 | Saitoh et al. | 399/49 |
| 7,267,255 | B1 * | 9/2007 | Young et al. | 226/15 |
| 2003/0219280 | A1 | 11/2003 | Lee | |

FOREIGN PATENT DOCUMENTS

| | | | |
|---|---|---|---|
| JP | 05-301651 | A | 11/1993 |
| JP | 09-169449 | A | 6/1997 |
| JP | 10-231041 | A | 9/1998 |

* cited by examiner

*Primary Examiner*—Douglas A Hess
(74) *Attorney, Agent, or Firm*—Frishauf, Holtz, Goodman & Chick, P.C.

(57) ABSTRACT

A belt conveying device includes: at least three rollers, about which an endless belt to convey an object, is entrained, including an oscillation roller having a rotation shaft, whose one end is fixed and another end is oscillatably supported; a belt detection sensor provided adjacent to a side edge of the belt, which detects presence of the belt; and a belt skew controller which controls the oscillator to oscillate the oscillation roller according to a preset control value in a predetermined range to correct skew. The oscillator moves a rotation center of a movable edge of the oscillation roller along a tangential line of an ellipse having elliptical focuses corresponding to rotation centers of rotation shafts of the two rollers, other than the oscillation roller, positioned respectively in upstream and downstream of and adjacent to the oscillation roller in a belt conveyance direction.

11 Claims, 10 Drawing Sheets

BELT CONVEYING DEVICE, IMAGE FORMING APPARATUS PROVIDED THEREWITH AND ADJUSTMENT METHOD OF BELT SKEW CONTROLLER IN BELT CONVEYANCE DEVICE

This application is based on Japanese Patent Application Nos. 2006-223436 filed on Aug. 18, 2006, and 2007-164415 filed on Jun. 21, 2007, which are incorporated hereinto by reference.

BACKGROUND OF THE INVENTION

This invention relates to a belt conveying device, image forming apparatus equipped therewith, and adjustment method of belt skew controller in the belt conveying device.

In the belt conveying device, in which an endless belt is entrained about predetermined number of rollers, one of which runs the endless belt as a drive roller, there is a case that what is called, belt skew occurs, which is a phenomenon that a running endless belt moves in the width direction (a direction perpendicular to the belt running direction).

In the image forming apparatus, such as an inkjet printer for forming an image onto a recording medium, which is closely contacted with the endless belt as an object to be conveyed, and onto which an image is formed by jetting ink drops of respective colors onto the recording medium while the recording medium is conveyed, this belt skew phenomenon allows the recording medium to meander and causes relative position deviations of respective color images, which forms an inferior image.

Once an abnormal situation of the belt skew occurs, there is a problem that the endless belt meanders in one direction, comes into contact with the frame holding rollers and destroys the rollers.

Thus, in a past, unexamined Japanese Patent Application No. 09-169449 discloses a belt conveying device having a function for detecting and controlling the belt skew to correct the belt skew by detecting at least two values from the group of a belt skew amount, a belt skew deviation amount and a belt skew speed and correcting the belt skew. Unexamined Japanese Patent Application No. 10-231041 discloses a belt conveying device having a function for detecting and controlling the belt skew by detecting a belt skew speed and a belt skew position to correct the skew.

In a belt conveying device, in which an endless belt is entrained between a drive roller and a driven roller, one end of the rotation shaft of the driven roller in a longitudinal direction is fixed and the other end is arranged to be capable of oscillating in direction parallel to the conveying direction of the object to be conveyed, the movement direction in the width direction of the endless belt is determined by the inclination of the driven roller, and belt skew is corrected by oscillating the other end of the driven roller in the direction parallel to the conveying direction.

Here, in the belt conveying device, in which a weight roller, other than the drive roller and the driven roller, is provided in order to give a predetermined tension to the endless belt in the lower direction, in the case when the driven roller is oscillated, the weight roller moves in an up and down directions in response to the oscillation amount of the driven roller.

This operation will be described by referring to FIGS. 15(*a*) and 15(*b*). FIG. 15(*a*) illustrates a plan view of a belt conveying device and FIG. 15(*b*) illustrates a font view when viewing the belt conveying device from the conveying direction side, where numeral 100 denotes a drive roller, numeral 101 denotes a driven roller, numeral 102 denotes a weight roller and numeral 103 denotes an endless belt.

In case when the endless belt 103 shifts in the left direction in FIG. 15(*a*), one end of the driven roller 101 (the left edge in the Figure) is oscillated in the direction, in which the driven roller 101 moves away from the drive roller 100, and inclined in the direction, which is parallel with the conveyance direction of the endless belt 103 by a predetermined control value to correct this shift. In this situation, since the driven roller 101 is inclined, the tension applied to the left side of the endless belt 103 in the Figure is larger than that of right side of the endless belt 103.

In this case, since the weight roller 102, normally, moves in the direction for relieving the tension of the endless belt 103, the left side in FIG. 15(*b*) moves upward and leans to relieve the tension of the left side of the endless belt 103 as illustrated in FIG. 15(*b*). Based on this operation, the endless belt 103 becomes to be capable of moving in the reverse direction of the shift direction so as to correct the skew.

However, in the case when dirt or dust of the belt adhered onto the internal surface of the endless belt 103 is adhered onto the drive roller 100 and the friction coefficient of the drive roller 100 decreases thereby, even though the driven roller 101 is controlled with the same control value, the shift direction of the endless belt 103 is reversed.

This will be illustrated in FIG. 16. FIG. 16 illustrates a graph showing the relationship between the friction coefficient μ of the drive roller 100 and the shift direction of the endless belt 103.

As illustrated in FIG. 16, even though the oscillation of the driven roller 101 is controlled with the same control value, in case when the friction coefficient μ of the drive roller decreases, the inclination of the driven roller 101 and the shift direction of the endless belt 103 are reversed. Namely, the weight roller 102 is in a state as illustrated in a two-dot chain line, the endless belt 103 shifts in the left direction in FIG. 15(*b*). This is because the element for determining the shift direction of the endless belt 103 changes from the driven roller 101 to the inclination of the weight roller 102.

As described above, in the case the situation becomes to the state that the friction coefficient of the drive roller 100 decreases, there has been a problem that when detecting the belt movement amount of the endless bet 103 and oscillating the driven roller 101 based on the predetermined control value as it has been, the endless belt 103 moves in the opposite direction to that for which it was intended to originally correct.

SUMMARY OF THE INVENTION

It is therefore, an object of the present invention to provide a belt conveying device and an image forming apparatus therewith having a simple structure, which are capable of stabilizing the control of endless belt skew without depending on the friction coefficient of a drive roller.

Another object of this invention is to provide an adjustment method of a skew controller in the belt conveying device, which is capable of simply correcting a deviation amount of the center value of the control range, into which the skew of the endless belt is controlled.

Still another object will become clear in following embodiments.

An object described above will be attained by the following embodiments.

According to one embodiment of the present invention, a belt conveying device including, an endless belt capable of conveying an object to be conveyed, at least three rollers about which the endless belt is entrained for driving the endless belt, the three rollers including an oscillation roller having a fixed edge, which is one end of a shaft of the oscillation roller supported not to be moved, and a movable edge, which is another end of the shaft supported so as to be freely oscillated, an oscillator for oscillating the oscillation roller by moving the movable edge, a belt detection sensor for detecting a skew in a width direction of the endless belt, the belt detection sensor being arranged adjacent a side edge portion of the endless belt, and a skew controller for moving the movable edge of the oscillation roller for a predetermined distance to correct endless belt skew in the width direction of the endless belt by controlling the oscillator by using a preset control value in a predetermined range, wherein the oscillator moves a rotation center of the movable edge of the oscillation roller along a tangential line of an ellipse having elliptical focuses corresponding to rotation centers of rotation shafts of two rollers, other than the oscillation roller, which are positioned respectively in upstream and downstream of and adjacent to the oscillation roller in a conveyance direction of the endless belt.

According to another embodiment of the present invention, an adjustment method of a skew controller of a belt conveying device including, an endless belt capable of conveying an object to be conveyed, at least three rollers about which the endless belt is entrained for driving the endless belt, the rollers including an oscillation roller having a fixed edge, which is one end of a shaft of the oscillation roller supported not to be moved, and a movable edge, which is another end of the shaft supported so as to be freely oscillated, an oscillator for oscillating the oscillation roller by moving the movable edge of the oscillation roller, a belt detection sensor for detecting skew in a width direction of the endless belt, the belt detection sensor being set adjacent a side edge section of the endless belt, and a skew controller for moving the movable edge of the oscillation roller for a predetermined distance to correct skew in the width direction of the endless belt by controlling the oscillator by using a preset control value in a predetermined range, the adjustment method of the skew controller including the steps of:

providing a belt end measuring member for measuring an edge position in the width direction of the endless belt, measuring respective positions of the endless belt in the width direction when conveying the endless belt for predetermined distances after oscillating the oscillation roller for predetermined distances with an upper limit value and a lower limit value of a preset control value in a predetermined range to operate the oscillator, calculating a deviation amount of a control center value from respective conveyance distances of the endless belt at the upper limit value and the lower limit value of the preset control value and respective movement amounts in the width direction of the endless belt measured by the belt end measuring member, and correcting a deviation amount of the control center value by using the calculated deviation amount.

DETAILED DESCRIPTION OF THE PREFERRED EMBODIMENT

An embodiment of the present invention will be described by referring to drawings below.

Figure 1:
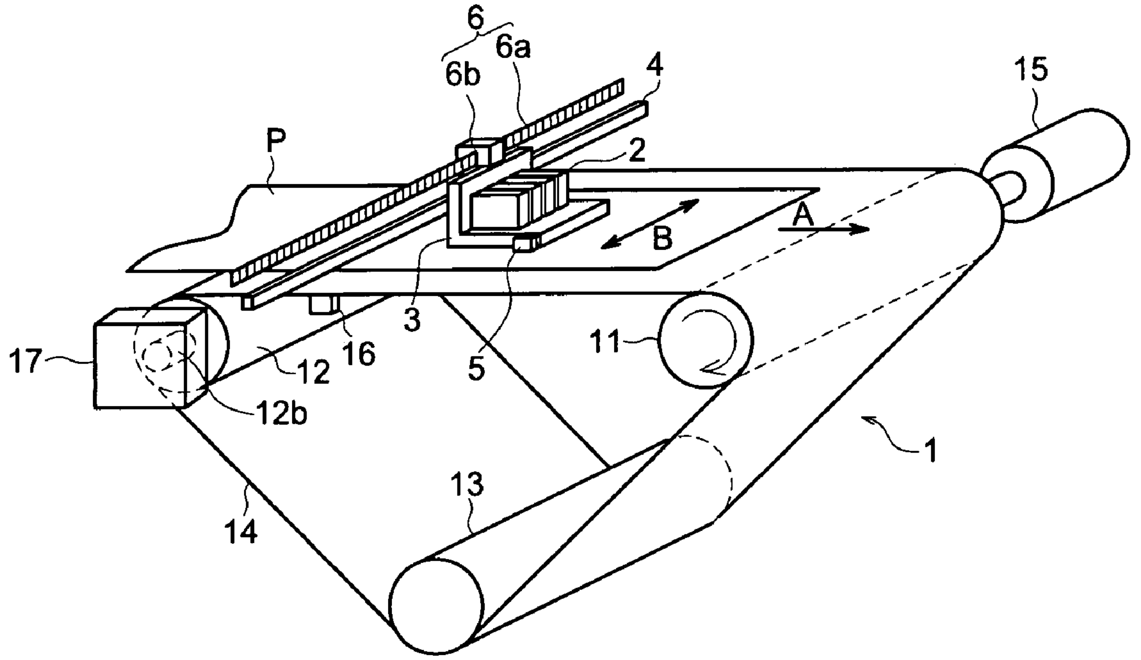
FIG. 1 illustrates a schematic diagram of an image forming apparatus having a belt conveying device.
Figure 2:
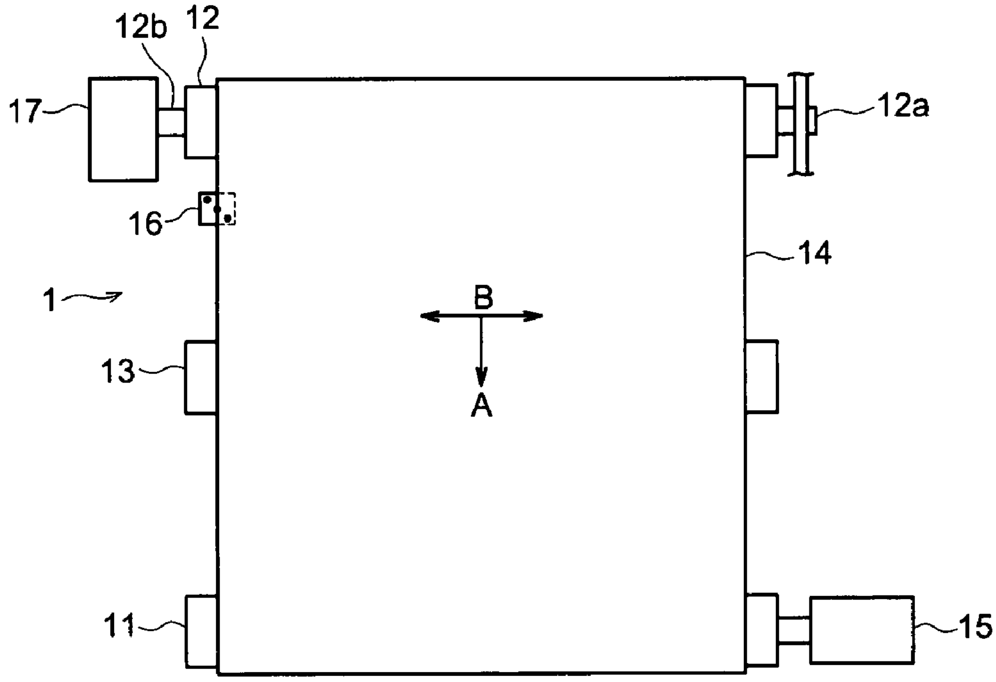
FIG. 2 illustrates a plan view of the belt conveying device.

FIG. 1 illustrates a schematic diagram of an image forming apparatus having a belt conveying device. FIG. 2 illustrates a plan view of the belt conveying device.

In FIG. 1, numeral 1 denotes a belt conveying apparatus. In the belt conveying apparatus 1, a drive roller 11 and a driven roller 12 are provided in parallel to each other with a predetermined interval. A weight roller 13 is provided below and between the drive roller 11 and the driven roller 12 viewed from the above thereof as a third roller and at the same time, an endless belt 14 is entrained about the drive rollers 11, the driven roller 11 and the weight roller 13.

In FIG. 1, a secondary scanning motor 15 rotates the drive roller 11 at a predetermined rate clockwise. The endless belt 14 is arranged to intermittently convey a recording medium P for a predetermined conveyance amount, which closely contacts with the surface of the endless belt 14, in a secondary scanning direction, which is shown by an arrow A.

It is preferable that a belt made of glass-cloth, onto which fluorine resin has been coated, structures the endless belt 14. There is no engagement between the endless belt 14 and the drive roller 11 and the driven roller 12 and the weight roller 13. The friction between the smooth rear surface of the endless belt 14 and the smooth outer surfaces of drive roller 11, the driven roller 12 and the weight roller 13 rotates and drives the endless belt 14.

The surface of the endless belt 14 has adhesiveness, which closely contacts with the recording medium P thereon. The recording medium P may be absorbed to the surface of the endless belt 14 by using electro-static absorption system.

With respect to the material of the recording material P, a recording material, which is normally used for an image forming application of the image forming apparatus, for example, paper, textile, plastic film and glass, may be used. The recording material P may be a sheet cut into a predetermined size or a long-rolled sheet continuously unrolled from a spool, onto which sheet is wound in a roll shape.

A belt detection sensor 16 is provided adjacent the side edge of the endless belt 14. The belt detection sensor 16 is to detect the skew of the endless belt 14 by detecting the existence of the endless belt.

Figure 3:
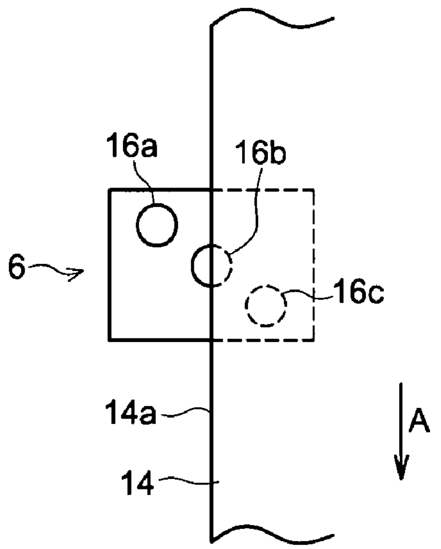
FIG. 3 illustrates a plan view for describing a belt detection sensor.

FIG. 3 illustrates a plan view for explaining a belt detection sensor 16 in detail.

The belt sensor 16 is provided adjacent a side edge section 14*a* of the endless belt 14, the belt sensor 16 being configured by three optical sensors 16*a*, 16*b* and 16*c* in order to detect the side edge section 14*a*. In the stable state where the skew of the endless belt 14 does not occur, a left edge sensor 16*a* is in an OFF state, which does not detect the side edge section 14*a* of the endless belt 14. A center sensor 16*b* positions substantially the same position as the side edge portion 14*a* of the endless belt 14. A right sensor 16*c* is in an ON state, which detects the endless belt 14.

The endless belt 14 is determined to be shifted to left viewed from the direction opposite to the direction of arrow A in case when the center sensor 16*b* of the belt sensor 16 is turned ON, and determined to be shifted to right in case when the center sensor 16*b* of the belt sensor 16 is turned OFF. The endless belt 14 is determined to be largely shifted to left in case when all the sensors 16*a*-16*c* are turned ON. The endless belt 14 is determined to be largely shifted to right in case when all sensors 16*a*-16*c* are turned OFF. Thus, the existence of the skew occurrence and the shift direction is determined by detecting the existence of the endless belt 14 by using the belt sensor 16.

Since the side edge section of the endless belt 14 is not always a straight line, the belt conveying device is normally arranged to correct the skew of the endless belt 14 by controlling the oscillation of the driven roller 12 so that the left sensor 16*a* is in a OFF state, the right sensor 16*c* is in a ON state and the center sensor 16*b* is in a degree where the center censor 16*b* periodically repeats the ON state and the OFF state.

Figure 12:
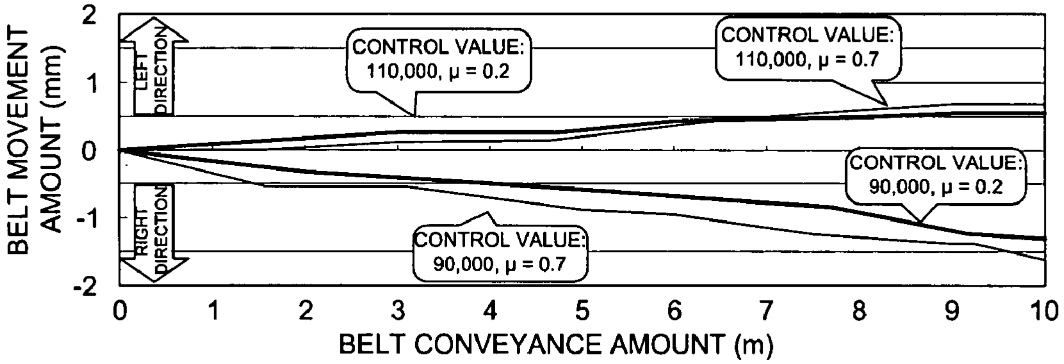
FIG. 12 illustrates the relationship between the belt conveyance amount and the belt movement amount when the friction coefficient of the drive roller changes.

As illustrated in FIG. 12, in the respective rollers, about which the endless belt 14 entrains, the driven roller 12 is arranged so that one end 12*a* of the rotational shaft is structured as a fixed end, which cannot move, and other end 12*b* is provided with an oscillator 17 to oscillate the driven roller 12 by moving the other end 12*b*. Accordingly, the driven roller 12 functions as an oscillator roller.

Figure 4:
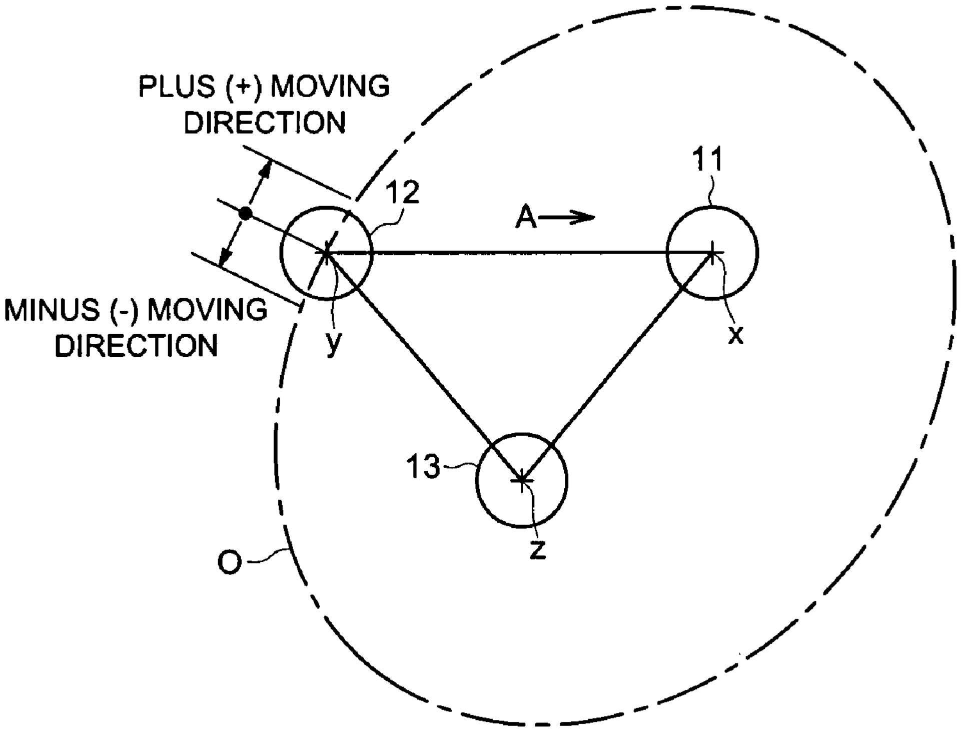
FIG. 4 illustrates a schematic drawing for describing an oscillation control of a driven roller.
Figure 5:
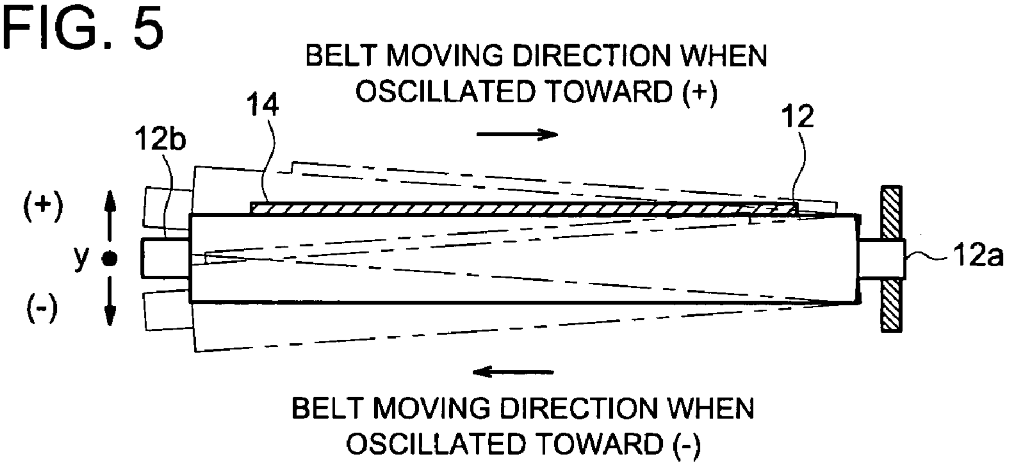
FIG. 5 illustrates a front view of the driven roller for describing the aspect of the oscillation of the conveying roller.

The outline of the oscillation control for the driven roller 12 in this embodiment will be described here. FIG. 4 illustrates a schematic drawing for describing an oscillation control of a driven roller 12. FIG. 5 illustrates a front view of the driven roller 12 for explaining the aspect of the oscillation of the driven roller 12.

When oscillation control of this invention is performed, the rotation center "y" of the other end 12*b* of a rotation shaft of the driven roller 12, which corresponds to the oscillation roller in this invention, moves along a tangential line "OT" of ellipse "O" having elliptical focuses, which respectively correspond to rotation centers "x" and "z" of the other edge of respective rotation shafts of the drive roller 11 and the weight roller 13.

In general, an ellipse is a curve formed by a set of points on a plane where the sum of the distance from any point on the curve to two ellipitical focuses is constant. Thus, assuming that the rotation center "x" on the other end of the drive roller 11 and the rotation center "z" on the other end of the weight roller 13 respectively correspond to the elliptical focuses and the rotation center "y" on the other end of the driven roller 12 is set substantially on the elliptical locus of the ellipse "O" as the deployment relationship among the drive roller 11, the driven roller 12 and the weight roller 13, the sum of the distance between x and y, and the distance between y and z becomes constant as long as the "y" moves along the elliptical locus of the ellipse "O". Thus, in the case when oscillating the driven roller 12, the rotation center "y" of the of the other end 12*b* of the driven roller 12 is arranged to move along the elliptical locus of the ellipse "O", there is no tension difference practically occurs with the endless belt 14.

Thus, when oscillating the other end 12*b* of the rotation shaft of the driven roller 12 so as to move along the elliptical locus of the ellipse "O", the movement of the endless belt 14 in the width direction is determined only by the deviation of alignment of the drive roller 11, the driven roller 12 and the weight roller 13. For example, as illustrated in FIG. 5, the rotation center "y" of the other end 12*b* of the driven roller 12 is oscillated in a (+) side so as to be along on the elliptical locus of the ellipse "O", the endless belt 14 moves in a right direction, and when oscillated in a (−) side, the endless belt moves in a left direction based on the deviation of the alignment of respective rollers.

Since the actual oscillation amount of the driven roller 12 is + or − (plus or minus) several mm, the movement along the elliptical locus of the ellipse "O" may be considered to be a straight line along the tangential line "OT" of the ellipse "O".

Figure 6:
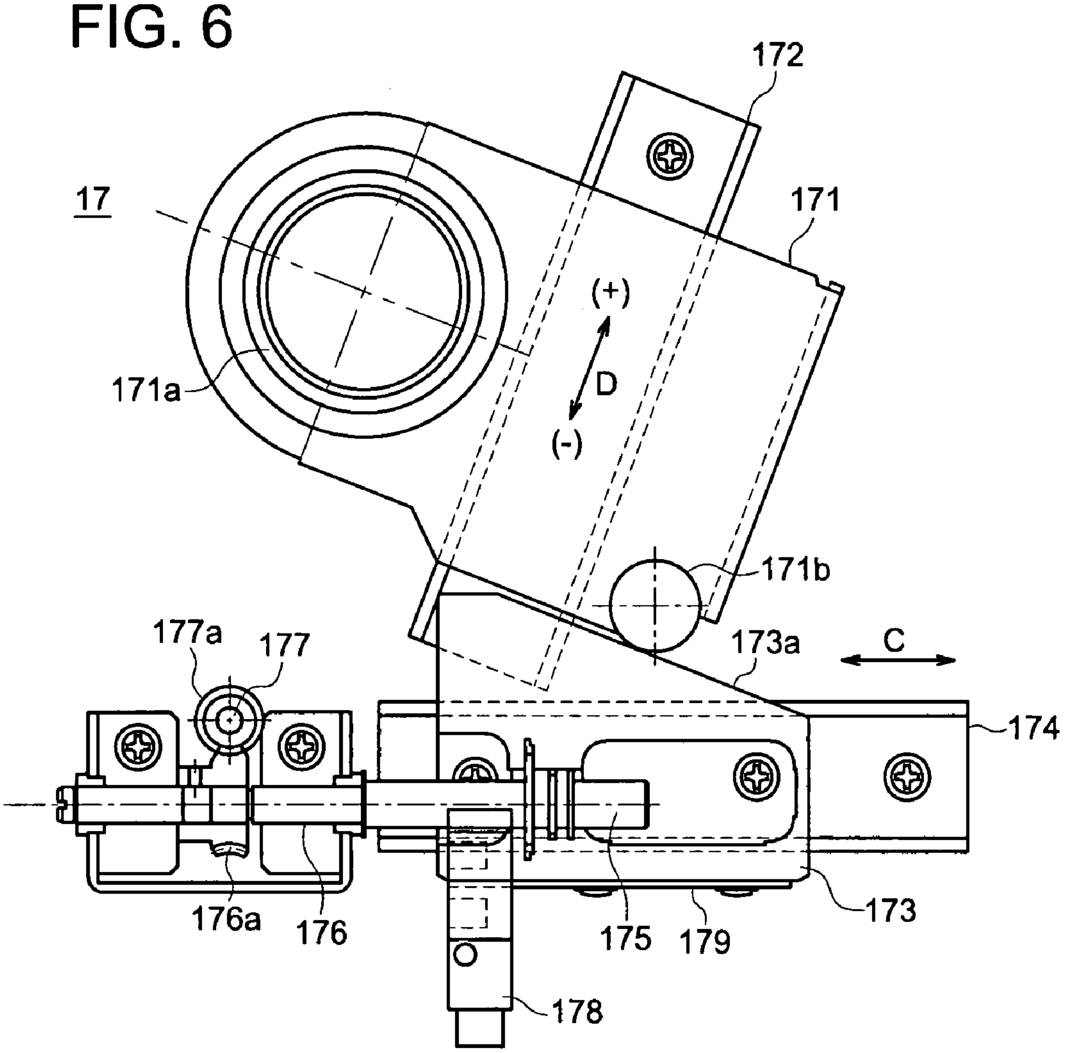
FIG. 6 illustrates a front view of a partial cross sectional view showing the structure of the main portion of the oscillator.
Figure 7:
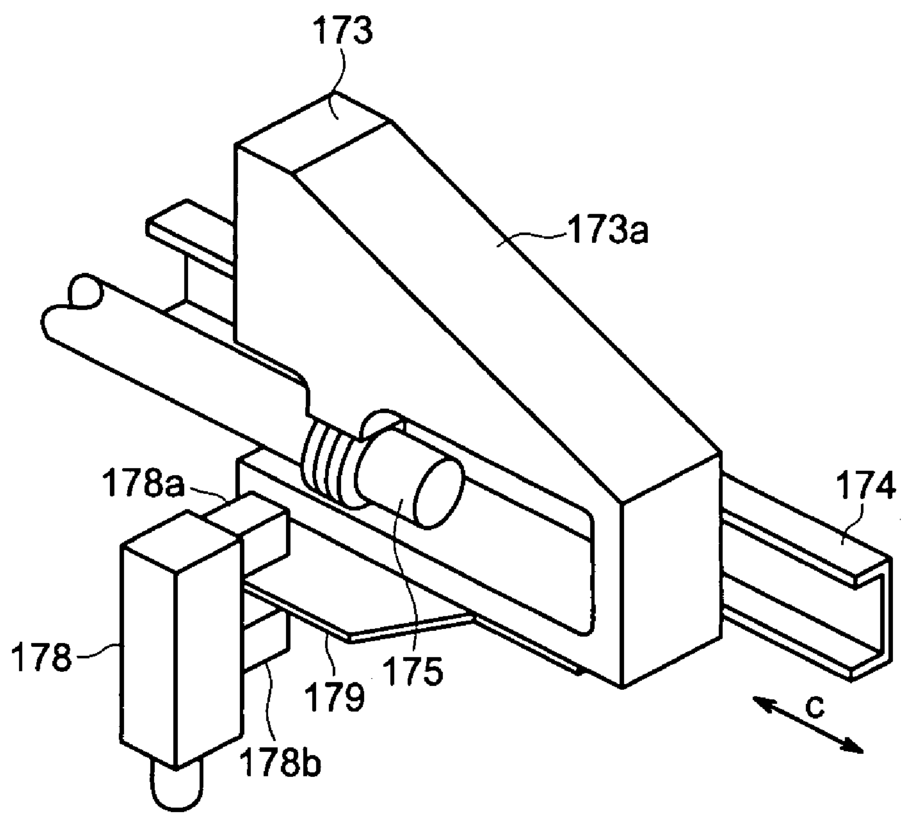
FIG. 7 illustrates a partial bird view of the oscillator.
Figure 8:
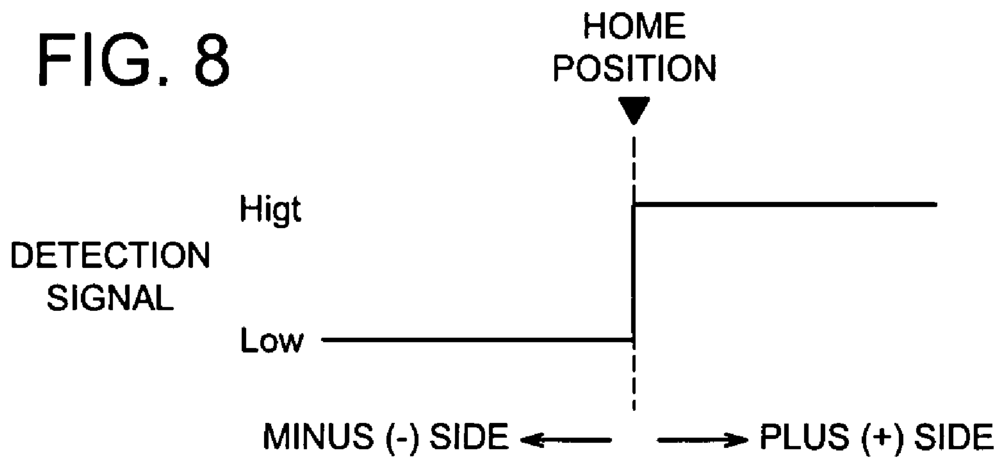
FIG. 8 illustrates the original place of a home position sensor.

FIGS. 6 and 7 illustrate an example of structure of an oscillator 17 for oscillating the other end 12*b* of the driven roller 12.

FIG. 6 illustrates a front view of the structure of the main portion of the oscillator 17 and a part of the structure is illustrated in a cross sectional view. FIG. 7 illustrates a partial bird's-eye view of the oscillator 17.

In FIG. 6, numeral 171 denotes a driven roller support plate, which is provided so as to be capable of obliquely moving upward along a guide rail 172. The driven roller support plate 171 includes a support section 171*a* for supporting the other end 12*b* of the rotation shaft of the driven roller 12 so as to be capable of rotating. With respect to the support member 171*a*, a rotational bearing or a slide bearing is used.

In FIG. 6, the driven roller 12 is attached in the depth side against the driven roller support plate 171 in the Figure.

Numeral 173 denotes a cam, which is provided so as to be capable of moving along a guide rail 174 in a C-direction, which is a horizontal direction. The upper surface of the cam 173 forms a cam surface 173*a* forming a slant surface inclining against the C-direction, which is a movement direction.

The cam surface 173*a* always contacts with a slide roller 171*b* provided at the lower edge of the driven roller support plate 171 so as to be capable of rotating. In case when the cam 173 moves in the right direction along the guide rail 174 in FIG. 6, the cam surface 173*a* obliquely moves the driven roller support plate 171 upward along the guide rail 172 as a slide roller 171*b* slides on the cam surface 173*a*. Further, in case when the cam 173 move in the left direction along the guide rail 174, the driven roller support plate 171 obliquely moves downward in the D-direction along the guide rail 172 as the slide roller 171*b* contacts with the cam surface 173*a* by self weight. Based on the movement of the driven roller support plate 171, the other end 12*b* of the driven roller 12, which is supported by the support section 171*a* so as to be capable of rotating, is oscillated in the (+) side or (−) side as illustrated in FIG. 5.

The guide rail 172 regulates the direction D, which is the movement direction of the driven roller support plate 171, so as to move substantially on the tangent "OT" of the elliptical locus "O" having elliptical focuses of the rotation center "x" of the drive roller 11 and the rotation center of the weight roller 13 as illustrated in FIG. 4. Thus, based on the movement in the right or left direction of the driven roller support plate 171, the other end 12*b* of the driven roller 12 is practically oscillated along the tangent "OT" of the elliptic locus "O".

An actuator 175 is fixed on the cam 173 via a bearing fixed thereon so as to be capable of rotating. One end of a rotation shaft 176, onto which a worm wheel gear 176*a* is fixed, is connected to the actuator 175. The worm wheel gear 176*a* meshes with a worm gear 177*a*. The worm gear 177*a* is fixed on a motor shaft 177 of a belt skew correction drive motor 216 (also referred to as a correcting member) provided so as to be perpendicular to the rotation shaft 176.

The belt skew correction drive motor is configured by a stepping motor. The belt skew correction drive motor rotates and drives a worm gear 177*a* in response to the pulse signals inputted thereto. Based on this operation, the worm wheel gear 176*a* meshed with the worm gear 177*a* rotates to rotate the rotation shaft 176. The actuator 175, which is connected to the front edge of the rotation shaft 176, moves back and forth based on the rotational direction of the rotation shaft 176.

The back and forth movement of the actuator 175 reciprocally moves the cam 173, onto which the actuator 175 is fixed, in the C-direction while the cam is guided by the guide rail 174. Based on this mechanism, the driven roller support plate 171 moves in the D-direction along the guide rail 172 while the driven roller plate 171 is guided by the cam surface 173*a*. As a result, the other end 12*b* of the driven roller 12 is oscillated.

A home position sensor 178 is provided adjacent the cam 173. The home position sensor 178 is an optical system sensor having a light emitting element 178*a* for emitting detecting light and a light receiving element 178*b* for receiving the detecting light. The home position sensor 178 detects the change of direction signals between the detection signals (Low) of the time when a shield plate 179, which is a detected member attached to the cam 173 as one body, shields the detecting light between the emitting element 178*a* and the light receiving element 178*b*, and the detection signals (High) at the time of receiving the detecting light when the cam 173 moves and shield plate 179 moves away from a position between the emitting element 178*a* and the light receiving element 178*b*. Based on this detection, the home position of the driven roller 12 can be detected.

The home position is a reference point of the control range of the oscillator 17 when oscillating the driven roller 12. The control range is defined by a movement amount of the cam 173 from the home position.

The home position may be defined as an edge portion, at which the detection signal (high) at the time when the shield plate 179 moves away from the point between the emitting element 178*a* and the light receiving element 178*b* changes to the detection signal (Low) at the time when the detecting light is shield by the shield plate 179. The home position is set to be a position where the other edge 12*b* of the driven roller 12 is positioned at a neutral position, which is not oscillated either (+) side or (−) side, and the endless belt 14 can be stably conveyed.

As illustrated in FIG. 1, an image forming apparatus of the invention includes a carriage 3 including a plurality of recording heads 2, the carriage 3 being provided above the belt conveying device 1. The recording heads 2 are configured by an on-demand type inkjet head for forming a required image by jetting ink drops onto a recording medium P in response to image data from multiple nozzles formed on respective nozzle surface while moving along the primary scanning direction, which is perpendicular to the A-direction, which is a conveyance direction of the recording medium P, together with the intermittent conveyance of the recording medium P based on the rotation of the endless belt 14.

The carridge 3 is arranged to be capable of reciprocally moving along a guide rail 4 provided in the width direction of the endless belt 14 by the rotation drive of a primary scanning motor (not shown). The recording heads 2 reciprocally moves in a B-direction, which is the primary scanning direction.

Figure 9:
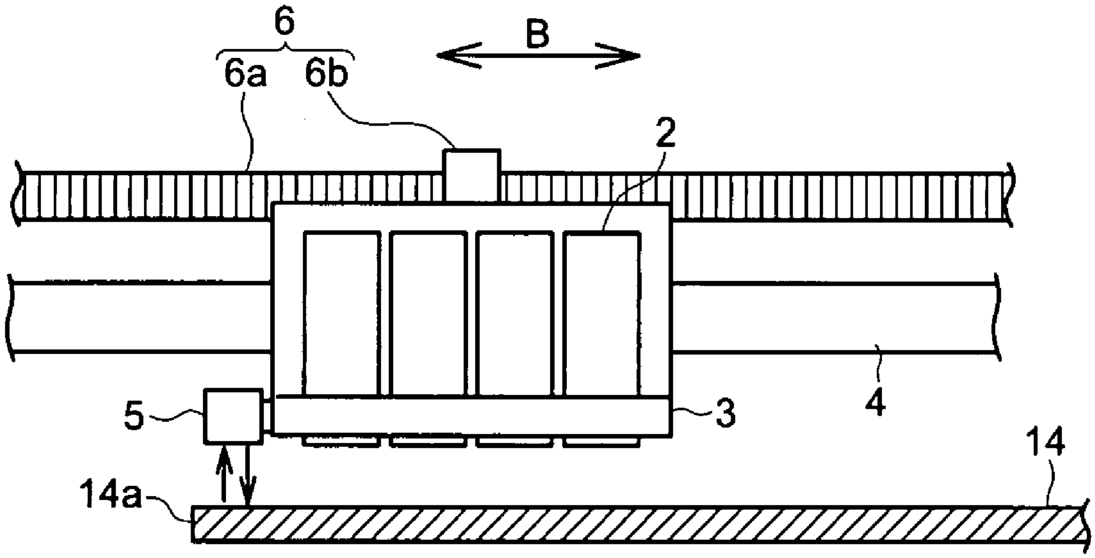
FIG. 9 illustrates a belt edge detection sensor.

The carridge 3 includes a belt edge position detection sensor 5. As illustrated in FIG. 9, the belt edge position detection sensor 5 detects the side edge portion 14*a* of the endless belt 14 by irradiating detecting light against the surface of the endless belt 14 positioned below the belt edge position detection sensor 5 and receiving the reflected light at that time. In the case when the belt edge position sensor 5 moves and approaches to the side edge portion 14*a* of the endless belt 14 together with the carriage 3, since no reflected light is received, the belt edge position detection sensor 5 detects that the carridge 3 has come to the position of the side edge portion 14*a* of the endless belt 14.

A linear encoder 6 for detecting the position of the carridge 3 detects position information. The linear encoder 6 is structured by a scale 6*a* provided parallel to a guide rail 4 and an encoder sensor 6*b* provided with the carridge 3 as one body. The encoder sensor 6*b* detects a pulse from the scale 6*a* as the carriage 3 moves. The position of the carriage 3 can be detected by counting the number of the pulse. Thus, when the belt edge detection sensor 5 detects the side edge portion 14*a* of the endless belt 14, the position of the side edge portion 14*a* of the endless belt 14 can be detected by detecting the position of the carriage 3 by detecting the number of pulses of the linear encoder 6.

Next, a schematic structure of the image forming apparatus will be described by using the block diagram illustrated in FIG. 10. Since the same symbol has been placed to the configuration, which has been already explained, the description of the configuration will be omitted.

Figure 10:
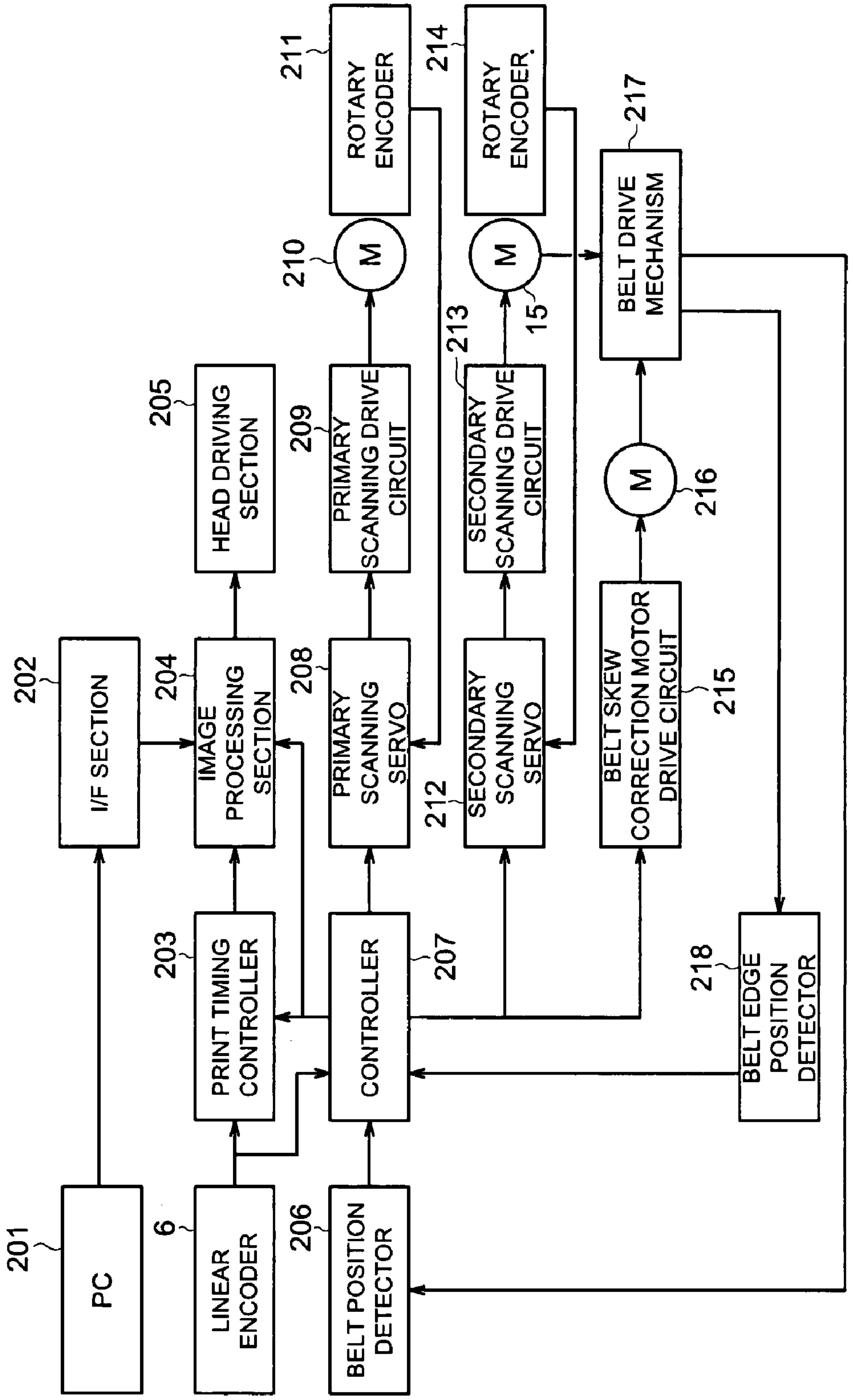
FIG. 10 illustrates a block diagram showing a schematic structure of the image forming apparatus.

In FIG. 10, numeral 201 denotes a personal computer (PC), numeral 202 denotes an interface section (I/F section), numeral 203 denotes a print timing section, numeral 204 denotes an image processing section, numeral 205 denotes a head driving section, numeral 206 denotes a belt position detector, numeral 207 denotes a controller, numeral 208 denotes a primary scanning servo, numeral 209 denotes a primary scanning drive circuit, numeral 210 denotes a primary scanning motor, numeral 211 denotes a rotary encoder, numeral 212 denotes a secondary scanning servo, numeral 213 denotes a secondary scanning drive circuit, numeral 214 denotes a rotary encoder, numeral 215 denotes a belt skew correction motor drive circuit, numeral 216 denotes a belt skew correction motor, numeral 217 denotes a belt drive mechanism and numeral 218 denotes a belt edge position detector.

PC 201 has image data. The image data is transmitted to the main body of the image forming apparatus via the I/F section 202. The transmitted image data is processed into a format suitable for image formation at the recording head 2 in the image processing section 204 according to control signal from the controller 207. Since the print timing controller 203 controlled by the control signal from the controller 207, the same as above, outputs control signal at an appropriate timing to the image processing apparatus 204, drive signal is outputted to the recording head 2 from the head drive section 205. The recording head 2 jets ink drops according to the drive signal.

The reciprocal movement along the primary scanning direction of the recording head 2 is conducted by activating the primary scanning motor 210 via the primary scanning drive circuit 209 controlled by the primary scanning servo 208. The rotation amount of the primary scanning motor 210 is detected by a rotary encoder 211, transmitted to the primary scanning servo 208 and controlled by the controller 207. The position information along the primary scanning direction of the recording head 2 moved by the primary scanning motor 210 is transmitted from the linear encoder 6 for detecting the position of the carridege 3 (refer to FIG. 1) and the print timing controller 203 is arranged to output control signal to the image processing section 204 in response to the position information of the carridge 3.

On the other hand, the endless belt 14 included in the belt drive mechanics 217 together with the drive roller 11, the driven roller 12 and the weight roller 13 are driven and rotated by activating the secondary scanning motor 15 (refer to FIG. 1) via the secondary scanning drive circuit 213 controlled by the secondary scanning servo 212 under control of controller 207. The rotation amount of the secondary scanning motor 15 is detected by the rotary encoder 214, transmitted to the secondary scanning servo 212 and controlled by the controller 207.

Further, the belt edge position detection sensor 5 included in the belt edge position detector 218 detects the existence of the side edge section 14*a* of the endless belt 14 and outputs the detection signal to the controller 207 while the carridge 3 moves in the primary scanning direction. In the case when the detection signal of the side edger section 14*a* of the endless belt 14 has been inputted from the belt position detector 218, the controller 207 measures the position of the side edge section 14*a* of the endless belt 14 based on the position information obtained from the linear encoder 6 at that time.

The belt skew correction motor 216 provided in the oscillator 17 is activated by the control signal through the belt skew correction motor drive circuit 215 controlled by the controller 207. The controller 207 obtains the determination whether there is existence of the movement of the endless belt 14 due to the oscillation of the driven roller 12 when the endless belt 14 moves in the width direction based on the information transmitted from the belt position detector 206 including the belt sensor 16. The controller 207 controls the drive of the belt skew correction motor 216 through the belt skew correction motor drive circuit 215 to correct the skew of the endless belt 14.

The control of the belt skew correction motor 216 by the controller 207 is conducted within a predetermined control value range (Pmin-Pmax), which has been set in advance, the predetermined control value range being in between a control value for moving the endless belt 14 in the right direction (+) in FIG. 5, and a control value for moving the endless belt 14 in the left direction (−) centering on the neutral position where the endless belt 14 is in a stable state, in order to prevent the excessive movement of the endless belt 14 in the width direction. The upper limit value and the lower limit value of the control value range are limit values in case when oscillating the driven roller 12 by driving the belt skew correction motor 216 for moving the endless belt 14 respectively in the right and left directions. The control value is set as the number of pulse outputted to the belt skew correction motor 216.

Figure 11:
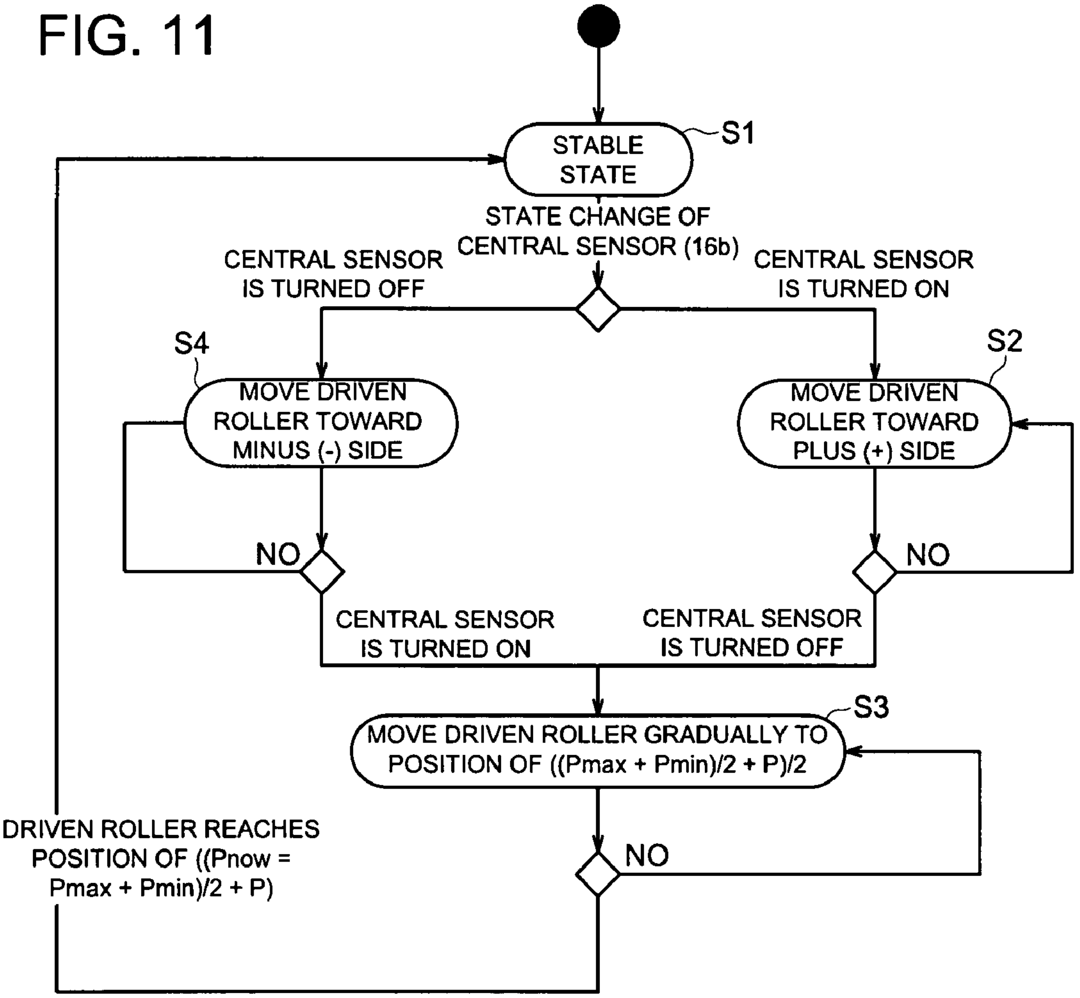
FIG. 11 illustrates a flowchart showing the control of the driven roller oscillation.

FIG. 11 illustrates a flowchart showing the oscillation control of the driven roller 12 by the controller 207 when correcting the belt skew.

While the endless belt 14 is stably rotating (S1), in case when skew occurs with the endless belt 14, the center sensor 16*b* of the belt detection sensor 16 is turned ON or OFF. When the center sensor 16*b* keeps the turn ON state for a predetermined period, it is detected that the endless belt 14 starts moving in a left direction in FIG. 2. Thus, controller 207 obliquely moves oscillation roller support plate 171 upward by driving the belt skew correction motor 216 via the belt skew correction motor drive circuit 215 and move the cam 173 of the oscillator 17 in the right direction in FIG. 6. Based on this operation, the other end 12*b* of the driven roller 12 is oscillated toward (+) side in FIG. 5 (S2). By the oscillation operation of the driven roller 12, the endless belt 14 moves so that the side edge section 14*a* moves away from the center sensor 16*b* in a width direction.

After the oscillation operation of the driven roller 12, when the skew of the endless belt 14 has been corrected, the center sensor is turned OFF again. Thus the controller 207 drives the belt skew correction motor 216 via the belt skew correction motor drive circuit 215 so as to gradually return the inclination of the driven roller 12 to the original state (S3).

On the other hand, in the case when the center sensor 16*b* becomes a situation where the center sensor 16*b* keeps a turn OFF state for a predetermined period from the stable state, it is detected that the endless belt 14 starts moving in a right direction in FIG. 2. Thus, controller 207 obliquely moves oscillation roller support plate 171 downward by driving the belt skew correction motor 216 via the belt skew correction motor drive circuit 215 and move the cam 173 of the oscillator 17 in the left direction in FIG. 6. Based on this operation, the other end 12*b* of the driven roller 12 is oscillated toward (−) side in FIG. 5 (S4). By the oscillation operation of the driven roller 12, the endless belt 14 moves so that the side edge section 14*a* moves toward the center sensor 16*b* in a width direction.

After the oscillation operation of the driven roller 12, when the skew of the endless belt 14 has been corrected, the center sensor 16*b* is turned ON again. Thus the controller 207 drives the belt skew correction motor 216 via the belt skew correction motor drive circuit 215 so as to gradually return the inclination of the driven roller 12 to the original state (S3).

Since the side edge section of the endless belt 14 is not always a straight line, the center sensor 16*b* of the belt detection sensor 16 repeats detection and non-detection operations of the side edge portion 14*a* of the endless belt 14 in a predetermined period. Thus, after gradually having moved the inclination of the driven roller 12 back to the original state, in case when the center sensor 16*b* has become to a state that the center sensor 16*b* repeats ON and OFF operations, the controller 207 determines that the endless belt 14 is positioned on substantially neutral position, and controls the oscillation of the driven roller 12 to be stopped.

Since the oscillator 17 moves the rotation center "y" of the other end 12*b* of the driven roller 12 along the locus "O" of the ellipse having elliptical focuses of the rotation center "x" of the drive roller 11 and the rotation center "z" of the weight roller 13, the oscillation control of the driven roller 12 does not practically generate the tension difference between the drive roller 11 and the driven roller 12 and weight roller 13, about which the endless belt 14 is entrained, and the skew of the endless belt 14 is corrected by only the deviation of alignment of respective rollers. Thus, irrespective to the existence of the friction resistance of the drive roller 11, it is possible to coincide the oscillation direction of the driven roller 12 to the movement direction of the endless belt 14.

FIG. 12 illustrates the relationship between the belt conveyance amount and the belt movement amount of the endless belt 14 when the friction coefficient μ of the drive roller 11 changes in the belt conveying device 1. Here, the cases when outputting the control value "110,000" for moving the endless belt in the left direction (+ direction) and outputting the control value "90,000" for moving the endless belt in the right direction (– direction) as control values for rotating and controlling the belt skew correction motor 216 are shown.

As understood from this graph, even though the friction coefficient μ of the drive roller 11 changes, for example, the friction coefficient μ equals to 0.2 or 0.7, in the case when the same control value is outputted, the movement direction of the endless belt 14 does not change and the relationship between the conveyance amount and the movement amount in the width direction is kept substantially the same state. Thus, it is apparent that according to a belt conveying device 1 of the invention, it becomes possible to stabilize the skew control of the endless belt 14 irrespective to the friction coefficient of the drive roller 11 by applying the oscillator 17.

In order to stabilize the skew correction of the endless belt 14 by the oscillation of the driven roller 12, it is preferable that the center value of the predetermined control range of the oscillator 17 coincides to the neutral position of the endless belt 14. In order to coincide both of them, following operation is necessary. Oscillate the driven roller 12 for respective predetermined distances with the upper limit value and the lower limit value of the control value range. Then obtain the deviation amount between the center value of the control range of the oscillator 17 and the neutral position of the endless belt 14 from the conveyance amount and shift amount in the width direction of the endless belt 14 after oscillating the driven roller 12 for a predetermined distance with the predetermined upper limit value and lower limit value of the control value range of the oscillator 17. Then correct the control center value of the oscillator 17 based on the deviation amount.

Figure 13:
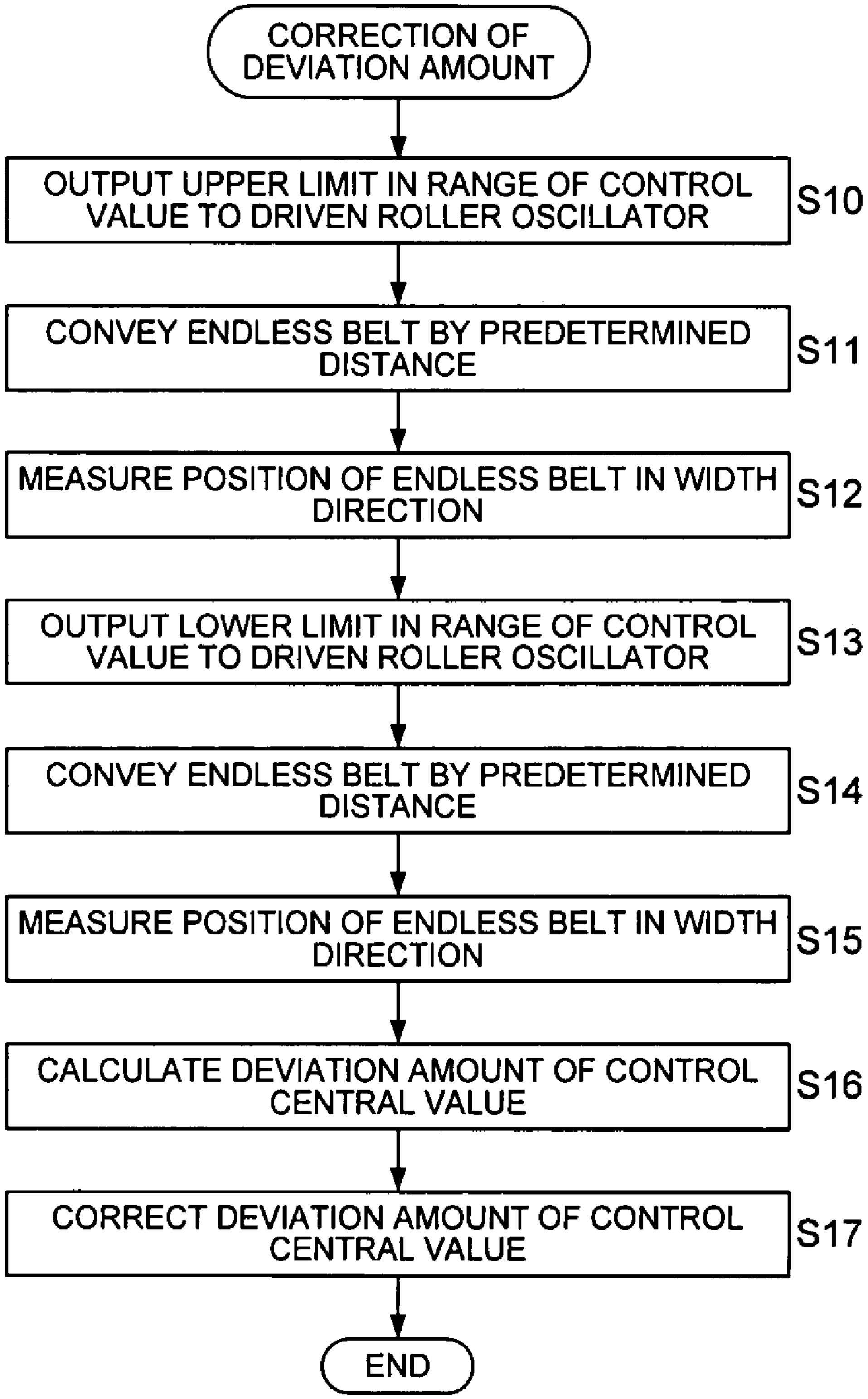
FIG. 13 illustrates a flowchart showing the correction process of the deviation between the center value of the control range of the oscillator and the neutral position of the endless belt.

This operation will be described referring to the correction process flow illustrated in FIG. 13.

Firstly, set the upper limit value (Pmax) of the range of the control value set in advance to the belt skew correction motor 216 of the oscillator 17 and oscillate the driven roller 12 for the predetermined distance (S10). Then, output the control signal corresponding to the predetermined step number to the secondary scanning motor 15 to convey the endless belt 14 for a predetermined distance in the conveyance direction (S11).

Based on this operation, since the endless belt 14 moves in the width direction by the oscillation operation of the driven roller 12, measure the position of the endless belt 14 in the width direction. The position of the endless belt 14 in the width direction can be measured by the controller 207 by moving the carriage 3 in the width direction, detecting the side edge section 14*a* of the endless belt 14 by the belt edge position detection sensor 5 and detecting the position of the carriage 3 when detected by a linear encoder 6. The movement amount of the endless belt 14 in the width direction can be measured by measuring the position of the endless belt 14 in the width direction.

Next, the same as above, set the lower limit value the (Pmin) of the range of the control value set in advance to the belt skew correction motor 216. Based on this operation, the driven roller 12 is oscillated to the opposite direction described above for the predetermined distance (S13). Then, convey the endless belt 14 for a predetermined distance in the conveyance direction (S14). Then, measure the position of the moved endless belt 14 in the width direction and measure the movement amount of the endless belt 14 in the width direction (S15).

Based on this operation, for example as illustrated in FIG. 12, the relationship between the respective conveyance amounts of the endless belt 14 in the conveyance direction and the respective movement amounts of the endless belt 14 in the width direction at the upper limit value and at the lower limit value of the range of the control value of the oscillator 17 can be respectively obtained.

Figure 15:
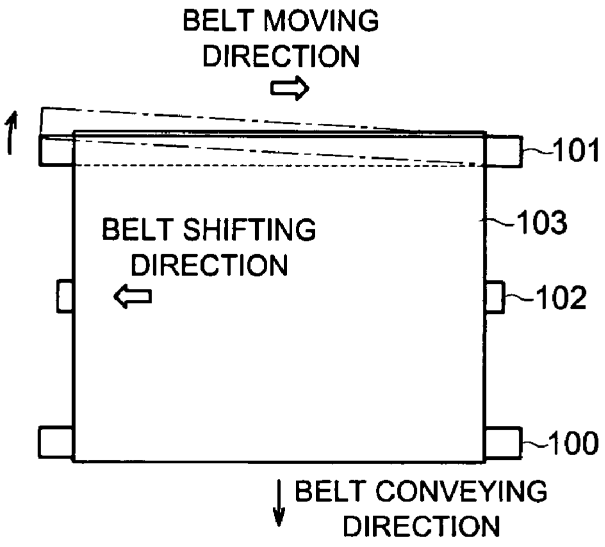
FIG. 15(*a*) illustrates a plan view of conventional belt conveying device and FIG. 15(*b*) illustrates a front view of the belt conveying device viewed from the belt conveyance direction.
Figure 15:
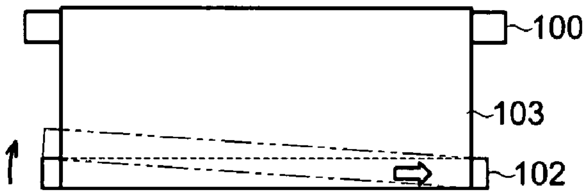
Figure 16:
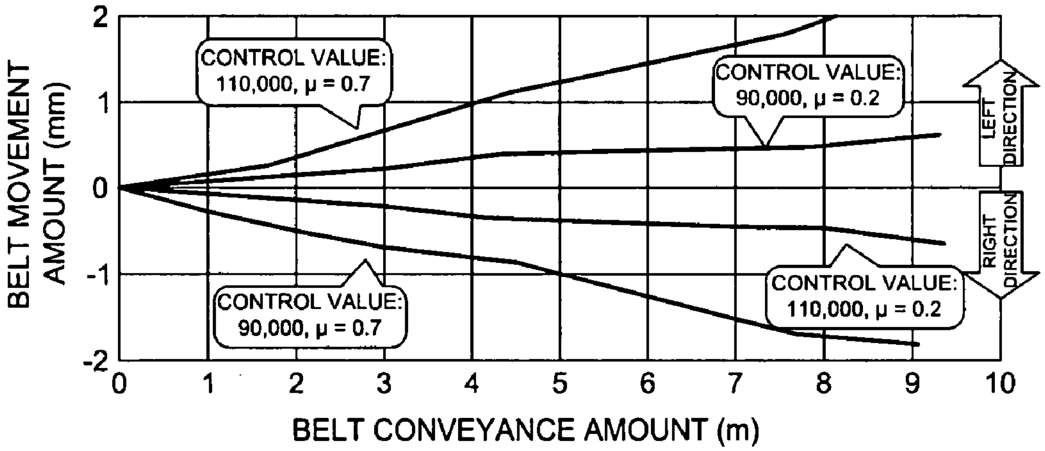
FIG. 16 illustrates a graph showing the relationship between the friction coefficient of a conventional drive roller and the belt shift direction of the endless belt.

Here, in case when the center value of the control range of the oscillator 17 coincides with the neutral position of the endless belt 14, the relationship between the conveyance amount and the movement amount in the width direction of the endless belt 14 should be symmetric with respect to a horizontal axis in FIG. 15 (up-and-down symmetry) at the upper limit value and the lower limit value of the control range. However, in the case when a deviation occurs between the center value of the control range of the oscillator 17 and the neutral position of the endless belt 14, the relationship between the conveyance amount and the movement amount in the width direction of the endless belt 14 become asymmetric with regard to the horizontal axis in FIG. 15 (up-and-down asymmetry).

Thus, the controller 207 detects the deviation amount based on the relationship between the respective conveyance amounts and the respective movement amounts of the endless belt 14 at the upper limit value and the lower limit value in the control range and calculates the deviation amount of the control center value of the oscillator 17 based on the detected deviation amount (S16). After that, the control center value of the oscillator 17 is corrected in response to the calculated deviation amount, thereby making to coincide with the neutral position of the endless belt 14 (S17).

Thus, in the case when skew occurs with the endless belt 14, the deviation can be stably corrected in both directions in the width direction by controlling the oscillator 17 by using predetermined control values.

In step S17, it is preferable to change the home position of the driven roller 12 in order to correct the deviation amount of the control center value of the oscillator 17. With respect to the method of changing the home position of the driven roller 12, following methods are listed. (1) To move the position of the home position sensor 178 for detecting the home position of the driven roller 12 along the C-direction in FIG. 6. (2) To move the position of the shield plate 179 provided with the cam 173 as one body of the oscillator 17 along the C-direction in FIG. 6. (3) To change the control value to be outputted to the oscillator 17, namely, to change the range of the control value for driving the belt skew correction motor 216. It is preferable to include any one of three methods listed above.

In the case of (1), the home position sensor 178 may be provided so as to be capable of moving along the C-direction. In the case of (2), the shield plate 179 may be provided so as to be capable of moving along C-direction. In the case of (3), the step number may be changed in response to the deviation amount from the home position, for example, in the controller 207.

The adjustment method of a skew controller for correcting the deviation amount of a control center value of the oscillator 17 may be executed when the product is shipped from the factory or at the time of maintenance service by a service person. This adjustment method can be applied to the belt conveying device for correcting skew by shifting an endless belt in the width direction by controlling the inclination of any one of a plurality of rollers, about which the endless belt is entrained, by using a control value within a predetermined range.

In the belt conveying device 1 described above, the endless belt 14 is entrained about three rollers, which are the drive roller 11, the driven roller 12 and the weight roller 13. In this invention, the number of roller, about which the endless belt 14 is entrained is at least three. Thus the number of roller, about which the endless belt 14 is entrained may be equal to or more than four.

Figure 14:
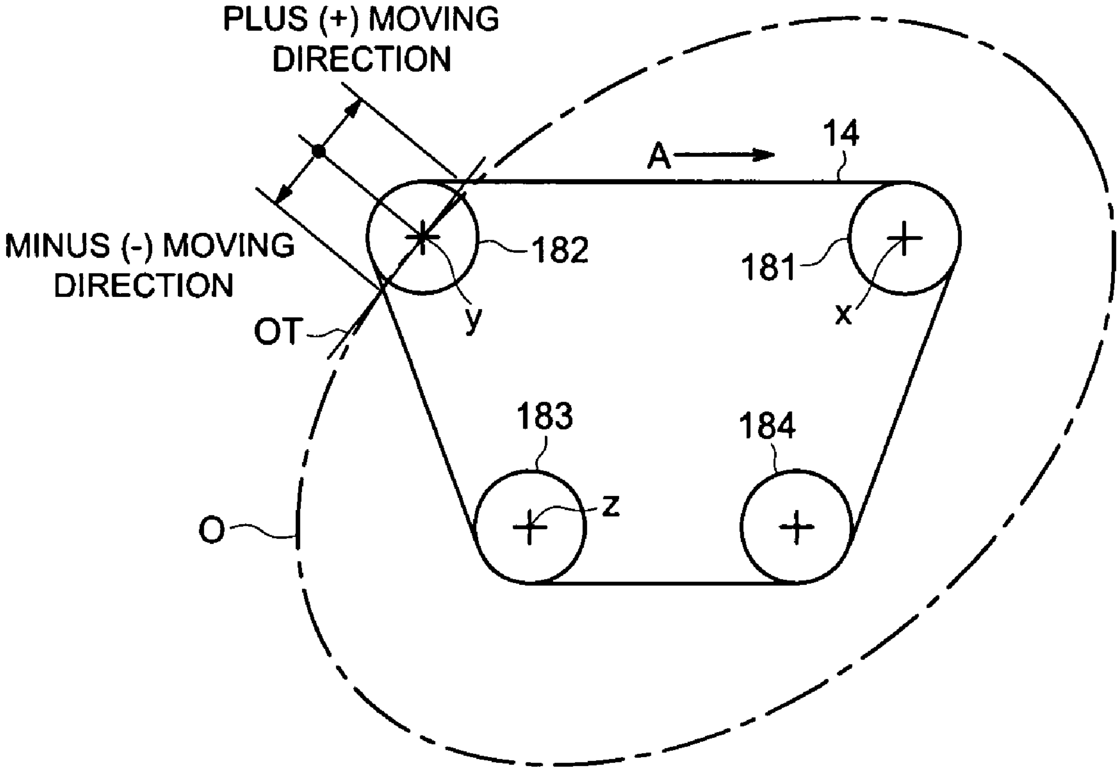
FIG. 14 illustrates an example of oscillation control when the endless belt is entrained about four rollers.

FIG. 14 illustrates an example of the oscillation control when the endless belt 14 is entrained about four rollers 181, 182, 183 and 184.

In case when the roller 182 is assumed to be an oscillation roller in four rollers 181, 182, 183 and 184, in order to correct the skew of the endless belt 14, a rotation center "y" of the other end of the rotation shaft of the oscillation roller 182 may be moved along a tangential line "OT" of ellipse "O" having elliptical focuses corresponding to rotation centers "x" and "z" of rotation shafts of respective two rollers 181 and 183, other than the roller 182, adjacent to each other positioned in upstream and downstream with respect to the oscillation roller 182 in a conveyance direction of the endless belt 14.

In case when the number of rollers further increases, the effect of this invention can be obtained by controlling the oscillation roller in the same manner.

Among the rollers, which are equal to or more than three rollers, about which the endless belt 14 is entrained, any one of rollers may be an oscillation roller. However, in case the oscillation roller is the driven roller, the oscillator 17 may be easily set, which is preferable.

Further, it is preferable that the oscillation roller may be a roller, which should be selected from other than two rollers utilized for structuring the platen surface, onto which recording medium P is placed. For example, in FIG. 14, the platen surface is structured by entraining the endless belt 14 about rollers 181 and 182, other than these rollers, for example, roller 183 or 184 may be used as an oscillation roller without giving inference on the horizontal condition of the platen glass even though the oscillation roller is oscillated.

A belt conveying device of the invention is not limited to the one utilized for the conveyance of the recording medium when recording an image onto the recording medium. For example, a belt conveying device of this invention can be widely applied to a field where skew phenomenon of the endless belt has become problematic in addition to the fixing apparatus for conducting fixing of the recording medium after image formation, and an intermediate transfer apparatus for an electro-photographic printer.

Further, an image forming apparatus of this invention can be widely applied to an image forming apparatus including a belt conveying mechanism for conveying recording medium, such as an inkjet printer, an inkjet textile printing apparatus, an electro-photographic printer and an image exposing apparatus.

According to an embodiment of the present invention, it becomes possible to provide a belt conveying device having a simple structure, which is capable of stabilizing the skew control of the endless belt independent of the friction coefficient of the drive roller and an image forming apparatus therewith.

According to an embodiment of the invention, there is provided an image forming apparatus having a simple structure, which is capable of stabilizing a skew control of an endless belt independent for the friction coefficient of a drive roller.

Further, according to an embodiment of the invention, there is provided an adjustment method of a skew controller of a belt conveying device, which is capable of simply correcting the deviation of the center value of the control range for controlling the skew of the endless belt.

What is claimed is:

1. A belt conveying device comprising:

(a) an endless belt capable of conveying an object to be conveyed;

(b) at least three rollers about which the endless belt is entrained, which drive the endless belt, the three rollers including a single oscillation roller having a rotation shaft, one end of which representing a fixed edge is supported not to be moved and another end of which representing a movable edge is oscillatably supported;

(c) an oscillator which oscillates the oscillation roller by moving the movable edge;

(d) a belt detection sensor provided adjacent to a side edge of the endless belt, which detects a skew in a width direction of the endless belt; and (e) a skew controller which moves the movable edge of the oscillation roller for a predetermined distance to correct the skew in the width direction of the endless belt by controlling the oscillator using a preset control value in a predetermined range, wherein the oscillator moves a rotation center of the movable edge of the oscillation roller along a tangential line of an ellipse having elliptical focuses corresponding to rotation centers of rotation shafts of the two rollers, other than the oscillation roller, which are positioned respectively in upstream and downstream of and adjacent to the oscillation roller in a conveyance direction of the endless belt.

2. The belt conveying device of claim 1, wherein the oscillator roller is a driven roller.

3. The belt conveying device of claim 1, further comprising:

a belt end measuring member which measures an edge position in the width direction of the endless belt, wherein the skew controller, oscillates the oscillation roller for predetermined distances with an upper limit value and a lower limit value of a preset control value in a predetermined range to operate the oscillator, and then measures respective positions of the endless belt in the width direction by the belt end measuring member when conveying the endless belt for predetermined distances, and calculates a deviation amount of a control center value from respective conveyance distances of the endless belt at the upper limit value and the lower limit value of the preset control value and respective movement amounts in the width direction of the endless belt measured by the belt end measuring member; and a correcting member which corrects a deviation amount of the control center value using the calculated deviation amount.

4. The belt conveying device of claim 3, wherein the oscillator comprises a stepping motor which oscillates the oscillation roller and a home position sensor which detects a home position of the oscillation roller, and the control range of the oscillation roller represents the movement amount from the home position, and wherein the correcting member corrects the deviation amount by changing the home position of the oscillation roller.

5. The belt conveying device of claim 4, wherein the change of the home position includes any one of movement of the home position sensor which detects the home position of the oscillation roller, movement of a position of an object member to be detected by the home position sensor and a change of a range of the control value of the oscillator.

6. The belt conveying device of claim 1, wherein during a skew correction of the endless belt is carried out, when the belt detection sensor detects continuously the endless belt for a predetermined period of time, the skew controller oscillates the oscillation roller so that the endless belt retreats from the belt detection sensor, when the belt detection sensor does not detect continuously the endless belt for the predetermined period, the skew controller oscillates the oscillation roller so that the endless belt approaches the belt detection sensor, and when the belt detection sensor repeats detection and non-detection operation for a prescribed period of time, the skew controller controls the oscillator so that an oscillation of the oscillation roller is stopped.

7. The belt conveying device of claim 1, wherein endless belt is a belt made of glass-cloth onto which fluorine resin is coated.

8. An image forming apparatus comprising the belt conveying device of claim 1.

9. An adjustment method of a skew controller of a belt conveying device including, an endless belt capable of conveying an object to be conveyed, at least three rollers about which the endless belt is entrained, which drive the endless belt, the three rollers including a single oscillation roller having a rotation shaft, one end of which representing a fixed edge is supported not to be moved and another end of which representing a movable edge is oscillatably supported, an oscillator which oscillates the oscillation roller by moving the movable edge, a belt detection sensor provided adjacent to a side edge of the endless belt, which detects a skew in a width direction of the endless belt, and a skew controller which moves the movable edge of the oscillation roller for a predetermined distance to correct the skew in the width direction of the endless belt by controlling the oscillator using a preset control value in a predetermined range, the adjustment method of the skew controller, comprising the steps of:

providing a belt end measuring member which measures an edge position in the width direction of the endless belt;

oscillating the oscillation roller for predetermined distances with an upper limit value and a lower limit value of a preset control value in a predetermined range to operate the oscillator, and then measuring respective positions of the endless belt in the width direction by the belt end measuring member when conveying the endless belt for predetermined distances;

calculating a deviation amount of a control center value from respective conveyance distances of the endless belt at the upper limit value and the lower limit value of the preset control value and respective movement amounts in the width direction of the endless belt measured by the belt end measuring member; and correcting a deviation amount of the control center value using the calculated deviation amount.

10. The adjustment method of claim 9, wherein the oscillator comprises a stepping motor which oscillates the oscillation roller and a home position sensor which detects a home position of the oscillation roller, and the control range of the oscillation roller represents the movement amount from the home position, and wherein correcting step is carried out by changing the home position of the oscillation roller.

11. The adjustment method of claim 10, wherein the step of changing the home position includes any one of moving the home position sensor which detects the home position of the oscillation roller, moving a position of an object member to be detected by the home position sensor and changing a range of the control value of the oscillator.

* * * * *